United States Patent [19]

Odom

[11] 4,241,326

[45] Dec. 23, 1980

[54] ELECTRONIC TRAFFIC CONTROL AND WARNING SYSTEM

[75] Inventor: William Odom, DuQuoin, Ill.

[73] Assignees: Martin A. Odom, Murphysboro; Pauline B. Presley, Carbondale; Clark Vineyard, Carbondale; James D. Hagler, Murphysboro, all of Ill. ; part interest to each

[21] Appl. No.: 1,728

[22] Filed: Jan. 8, 1979

[51] Int. Cl.[3] .................................... H04B 7/00

[52] U.S. Cl. .................................... 340/33; 340/539; 455/99; 455/152

[58] Field of Search .................... 340/52 R, 53, 31 R, 340/32, 33, 34, 539; 343/225, 226; 325/37, 64, 38 R; 455/68, 95, 99, 152

[56] References Cited

U.S. PATENT DOCUMENTS

| | | | |
|---|---|---|---|
| 3,233,217 | 2/1966 | Bost, Jr. | 340/33 |
| 3,461,423 | 8/1969 | Trumble | 340/52 |
| 3,532,986 | 10/1970 | Gelushia et al. | 340/33 |
| 3,876,940 | 4/1975 | Wickord et al. | 340/33 |
| 3,986,119 | 10/1976 | Hemmer, Jr. et al. | 325/3 |

*Primary Examiner*—Alvin H. Waring

*Attorney, Agent, or Firm*—Kalish & Gilster

[57] ABSTRACT

An electronic system provides traffic control and warning functions by radio transmission of signals to civilian vehicles from authorized mobile units, such as police vehicles and portable units at dangerous locations, such as the scene of an accident or road obstruction, etc., utilizing transmission within a police communications band. Transmitting circuitry carried within the mobile unit includes means for modulating the frequency modulation carrier signal radiated by an antenna with either a voice message or by preselected pulse messages. Receiving circuitry is carried within each of a plurality of civilian vehicles separate from the mobile unit, the antenna of such vehicles picking up the modulated carrier signal when the vehicle is within at least the general vicinity of the transmitting mobile unit. The receiving circuitry provides automatically selective response to the modulated carrier signal regardless of its frequency within the band and includes a demodulator and a pulse separator circuit responsive to a demodulated pulse message. A sequential switching arrangement and signalling devices interconnected with it provide visual signalling in different formats to the operator of the receiving vehicle. A further circuit is responsive also to operation of the sequential switching equipment to interconnect a transducer with the amplified output of the demodulator in response to the detection of a predetermined pulse message of a predetermined second type. Such arrangement allows the operator of the mobile unit, e.g., a policeman, to signal drivers of receiving vehicles by display of visual signals within such vehicles and also to speak directly to such drivers.

33 Claims, 7 Drawing Figures

ELECTRONIC TRAFFIC CONTROL AND WARNING SYSTEM

BACKGROUND AND SUMMARY OF THE INVENTION

This invention relates to radio frequency communication systems and vehicle warning systems and, more particularly, to an electronic system utilizing radio transmission to warn, direct, and inform vehicle operators by use of visible and audible information, or both, for general traffic control and warning purposes.

The crowding of highways, the need for conservation of fuel, and increasing concern for safety, have emphasized the importance and desirability of rigidly enforcing the observation of vehicle speed limits with consequent imposition of a national maximum speed limit. However, the limiting of speed is not in and of itself a solution to the need for warning an unwary driver or one heedlessly bent on maintaining the maximum speed limit.

There has been a long-felt need to warn drivers to observe reduced speed limits in dangerous situations or in locations where there are operations of vehicles in excess of a certain speed constitutes a clear and present danger to themselves, occupants of other vehicles, and pedestrians. In the event of emergency conditions or road conditions of an abnormal or otherwise unsafe character, there is a need to alert drivers, as by indicating to them the existence of a situation requiring the reduction of speed or other extraordinary action.

As our society has changed from a primarily rural nature to a more or less urban nature, and as population and density of automobiles on our highways have increased, there has grown up a forest of signs along our highways. There are signs to the right, signs to the left, signs overhead, and signs on the pavement. In many situations, one is distracted by the variety and plethora of advertisements and directional signs, as well as those which identify various routes or which caution against parking, give various information relative to the location of facilities and services, and others. All of these detract from a driver's ability to concentrate on warning signs. Thus, to an extent greater than ever before, drivers frequently ignore warning signals and particularly those calling attention to unusual or dangerous conditions.

Even if drivers were more wary than they are and heeded the admonitions of signs pointing out dangers and the need to take precautions, as for example, the reduction of speed or changing of lanes to avoid a dangerous condition, it must be recognized that signs have no "voice" or other capability to warn of severe weather conditions such as low visibility and lack an intrusive nature which commands a driver's attention when he is confused, fatigued, or is momentarily distracted by something within or without his vehicle such as, for example, when he is tuning his radio, attending to various amusement appliances such as tape players or the like, lighting smoking material, talking with passengers, or is looking at a map, etc. Further, a driver may, out of habit, tend to drive in a haphazard and careless manner which overlooks safety. The attention of such drivers is not commanded by signs.

Accident stastics reveal that the imposition of speed limits has not overcomes these long-standing problems and the multiplicity and financial magnitude of claims against automobility liability insurers evidence a continuing and most compelling need for finding additional ways to prevent vehicle accidents that result in injury, loss of life and property.

What is needed are improved ways of providing to a driver aural and/or visual warnings of a nature which will command a driver's attention so that the driver may be alerted to dangerous conditions, the need to take evasive action, reduce speed, pull over, or the like. Because of the crowding of highways and ever present wailing of sirens and existence of various sources of external flashing lights, drivers often fail to heed such signals. Moreover, the shattering effect on the nerves of a motorist produced by a screaming siren or loud air horns of a fire engine as the same approach a vehicles has sometimes caused drivers to panic and act in an irrational or dangerous way. There have been heretofore a picking up by means of a microphone, amplifying and then reproducing within a vehicle sounds of a siren, horn or other allowed noise generated externally of the vehicle. But, such systems do no more than increase the effective loudness of such screaming sirens or other loud noises. Thus, such systems fall far short of representing a solution of the problems hereinabove discussed.

It would be most desirable if police officers or the authorized officers of other emergency vehicles such as fire engines, ambulances or rescue equipment, could speak directly to drivers or in other ways cause them to receive visual or aural warning signals within their vehicles.

It has been proposed in Bost U.S. Pat. No. 3,233,217 to provide a vehicle signal device having a plurality of warning lights which are adapted to be actuated by a transmitter which is either fixed, or is carried by an ambulance, a fire truck, police car, or the like. The device is intended to be mounted within a vehicle and has several lights which may signal various conditions dependent upon the tone with which the transmitted signal is coded. However, such system provides no audible signalling of the driver, much less a capability of direct voice transmission to a driver from a police vehicle, and the provision of simple warning lights, as proposed by this reference, does not solve the foregoing problems.

An electronic warning system for vehicles is contemplated by Gelushia et al U.S. Pat. No. 3,532,986 wherein there is disclosed a warning system for vehicles in which each vehicle in a similar mode of travel would be similarly equipped with a system including a combined transmitter-receiver. The transmitter is provided with an oscillator which modulates the transmission frequency so that the receiver of another vehicle can detect an audio signal, including possible voice transmissions, and provide the same to a loud speaker within the receiving vehicle as an alarm. But, like the Bost disclosure, this patent comtemplates a system tuned to a specific frequency. Thus, to transmit any usable information from another vehicle to a receiving vehicle, the transmitting vehicle would have to be tuned to a specific frequency. In addition, the Gelushia et al system is not capable of discriminating between various types of different signals which might represent different conditions as to which it is desired to give warning, but instead is designed to receive all transmissions on the specific frequency to which it is pretuned.

A more sophisticated approach is the emergency communication system disclosed by Hemmer et al U.S.

Pat. No. 3,986,119 wherein vehicles equipped with portable communicators may initiate communication with a radio relay station which then establishes a further communications link with a terminal station. The latter sends back signals to a remote receiver-transmitter which in turn signals the portable transmitter-receiver carried by a vehicle that a message has been received. Such system is not intended for receiving transmissions from a police vehicle, nor does the system lend itself for voice transmission between the portable units carried by vehicles and police radio-transmission equipment.

Generally relevant to the problem of providing the transmission of warning systems of a vehicle in distress is Trumble U.S. Pat. No. 3,461,423 which contemplates not only a circuit adapted for modulating the transmitted frequency with one of various tones in accordance with a type of condition to be signalled, but also the provision of a commercially activated switch which closes in response to a collison or the like to initiate emergency transmission. But, like the previous references, such transmission is at a specific frequency different from that utilized by police and does not provide for transmission of voice messages from a police vehicle to another vehicle.

These and numerous other patents represent the diverse and fragmented efforts of many others to provide partial solutions to the needs which are discussed hereinabove. Yet, taken individually and collectively, they fail to represent a comprehensive solution to such problems. Moreover, these efforts of the prior art have generally failed to make use of existing radio equipment, such as that which police vehicles are presently equipped, for the purpose of providing, within civilian vehicles, audio tones of a useful warning character, direct or recorded voice messages from police vehicles or other transmitters useful for providing warning messages, as well as visible indications and combinations of audible and visible signalling.

It is an object of the present invention to provide a comprehensive system utilizing radio transmission on police band frequencies for providing to drivers, within civilian vehicles, visible and audible warnings or other messages for traffic control purposes transmitted from positions remote from such vehicles.

A further object of the invention is to provide such a system with the capability of delivering voice transmission to such drivers of civilian vehicles from police or other authorities transmitting within the police band.

Yet another object of the invention is to provide such a system allowing direct voice communications to drivers of such civilian vehicles by police or other authorities or governmental agencies without requiring resort to the use of sirens, horns, or flashing lights on police or other governmental vehicles to alert such drivers.

Another object of the invention is the provision of a system of the character stated which provides visible and audible warnings to drivers within civilian vehicles only upon the selective transmission of pulse coded signals from authorized equipment.

Another object of the invention is the provision of such a system wherein warnings may be transmitted to such civilian vehicles on any frequency within a given police band.

A related object of the invention is the provision of such a system which is selective to such signals transmitted at any frequency within a police band.

A further object of the invention is the provision of a system of the character stated wherein visible or audible warnings, or both, may be transmittd automatically by radio transmission automatically in response to a collision involving such vehicle.

Yet another object of the invention is the provision of a system of the character stated adapted for providing visible and audible warnings within such civilian vehicles in response to dangerous conditions which are present in advance of a civilian vehicle as it travels along a highway.

Among further objects of the invention may be noted the provision of such a system which is constructed of proven, inexpensive, and reliable electronic circuitry; which is assembled with the use of a minimum of parts and is conducive to extremely economical mass-production assembly; and which is reliable and long-lasting in use.

Other objects will be in part apparent and in part pointed out hereinbelow.

DESCRIPTION OF THE PREFERRED EMBODIMENTS

Figures 1, 6:
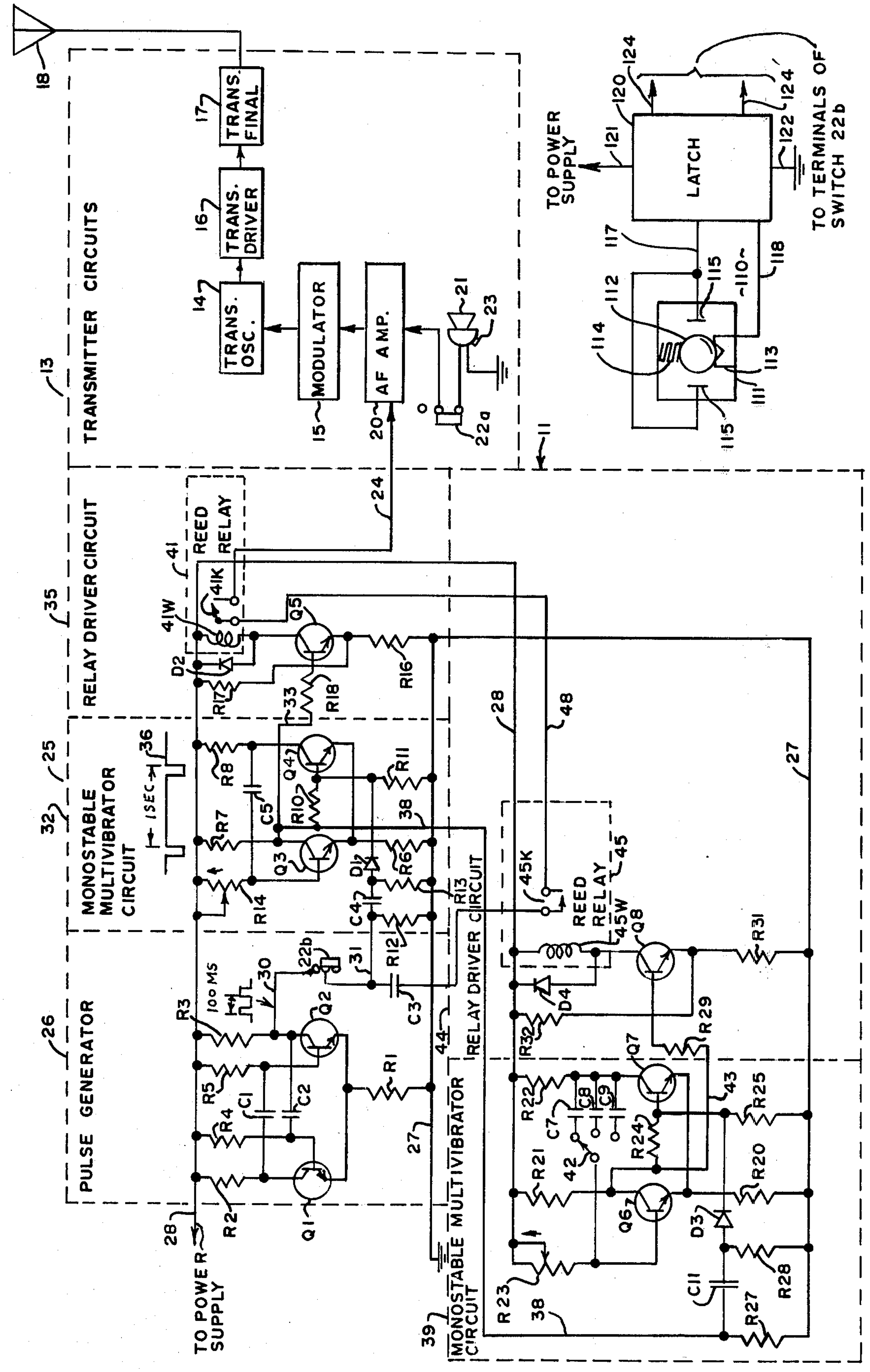
FIG. 1 is a schematic diagram of a transmitting circuitry of an electronic traffic control and warning system constructed in accordance with and embodying the present invention.
FIG. 6 is a partly pictorial, partly schematic diagram of collision-responsive apparatus and circuitry for causing transmission of encoded radio frequency signals from a vehicle equipped with the transmitting circuitry of FIG. 1.

Referring now to the drawings and particularly to FIG. 1, illustrated generally at 11 is circuitry of the invention for transmission of radio signals for purposes of warning and providing voice messages, as for traffic control, to drivers within civilian vehicles, the circuitry of FIG. 1 being carried by a police vehicle, some other governmental vehicle or other authorized mobile unit, such as, merely for example but without limiting the invention, a fire engine, an ambulance, or rescue equipment, or temporarily fixed portable unit of an otherwise mobile character. It will be understood that all of the components and circuits of FIG. 1 are carried upon said vehicle in conventional electronic equipment housings of the usual type employed for transmitting equipment utilized for police and similar vehicles.

Generally speaking, the transmitting system 11 preferably makes use of existing transmitting circuitry 13, normally carried by the vehicle, which comprises a transmitter oscillator 14 of usual configuration, e.g., operating within a preselected police band. Oscillator 14 is adapted to provide an output signal, which is frequency modulated in response to the modulator 15, which output signal is supplied to a transmitter driver circuit 16 of conventional design. The driver circuit supplies an amplified signal to a final amplifier stage 17 of the transmitter with which is connected the usual antenna 18, e.g., of the whip type, which typically protrudes from the vehicle for transmitting of the signal supplied thereto from transmitter final stage 17.

In accordance with the invention, transmitter oscillator 14 is adapted to provide an FM output signal within a police band, e.g., 152–162 MHz, which is within the high VHF band, which is approximately 146–174 MHz. Understandably, FM transmission of this type may also be within another police band such as the low VHF band (40–50 MHz) or the UHF band (450–500 MHz) typically used for the transmission of police messages. However, regardless of whether VHF or UHF is utilized, such FM transmission will be within a given police band which is routinely used by police authorities for transmission from a central headquarters to police vehicles, i.e., mobile units from one such police vehicle to another police vehicle, or from police vehicle to the same or different headquarters. Such transmitting systems typically may transmit from 50 to 100 watts if vehicle-borne and more in the case of base stations.

Designated 20 is an audio frequency amplifier of conventional design with which a microphone 21 is normally connected. However, in accordance with the invention, there is specially provided in a microphone lead normally interconnecting the microphone with the amplifier means 20 one normally-closed, momentary opening pushbutton switch section 22*a*. When operated, switch means 22 disconnects the microphone so that voice modulation will not occur during transmission of tone-encoded signals, for reasons to be more fully developed. But switch means 22*a* should not be confused with the conventional microphone switch 23 used for causing the transmitter circuits to transmit a signal.

As noted, components 14, 15, 16, 17, 20, and 22 advantageously may be constituted by the conventional radio frequency transmitter system 13 which is utilized either for transmitting from a base (e.g. headquarters) station, or from a police vehicle, for routine communication purposes, although a specialized separate transmitting system may be used for present purposes. But, if conventional and existing for other purposes, such system 13 is modified in accordance with this invention by supplying thereto, by means of a lead 24, a pulse-form signal for the purpose of causing a pulse modulated signal, and specifically a high speed ICW (interrupted carrier wave) signal to be transmitted by antenna 18, and by the provision of switching means 22*a*.

The circuitry for generating the pulse modulation signal supplied by lead 24 is designated collectively 25. Such circuitry comprises a pulse generator outlined within a block 26 comprising a pair of NPN transistors Q1 and Q2 having their emitters connected through a common emitter resistor R1 to a circuit lead 27 providing a ground connection for the pulse generator and other circuitry to be described. A further circuit lead 28 is utilized for providing a voltage of a level suitable for powering such semiconductor circuitry, e.g., the vehicle battery at, for example, positive 12 VDC. The respective collectors of transistors Q1 and Q2 are connected through respective resistors R2,R3. The bases of transistors Q1,Q2 are connected through respective base biasing resistors R4,R5. Coupling capacitors C1,C2 respectively interconnect the base of one transmitter with the collector of the other. Accordingly, there is seen to be provided a free-running or astable multivibrator providing pulses via an output lead 30 at a pulse repetition rate of preferably approximately 10 cps (i.e., at a period of 100 msec). Interconnected with output lead 30, which is connected at one end to the collector of transistor Q2, is another section 22*b* associated with pushbutton switch means 22*a*. When selectively momentarily closed by the operator of the vehicle, switching means section 22*b* is adapted to supply the output signal from pulse generator 26 via a coupling capacitor C3 to certain relay contacts to be described and, via a circuit lead 30 to a monostable multivibrator circuit 32 utilized for timing purposes.

More specifically, the monostable multivibrator circuit 32 comprises a pair of NPN transistors Q3,Q4 having a common emitter resistor R6, each having its collector collected through a respective resistor R7,R8 to the power supply lead 28. A coupling capacitor C5 interconnects the base of transistor Q3 with the collector of Q4, while the base of the latter is biased relative to the collector of transistor Q3 by means of resistors R10,R11. The output signal provided from pulse generator 26 via output lead 31 is provided by means of coupling capacitor C4 through a diode D1 to the base of transistor Q4. The provision of resistors R12,R13 respectively connecting the opposite sides of capacitor C4 to the circuit ground lead 27 for filtering, or isolation, purposes may be noted. The base of transistor Q3 is biased at a preselected level by a potentiometer R14 for permitting preselection of a time delay provided by operation of the monostable multivibrator circuit 32.

It will be seen that pulses provided via coupling capacitor C4 to the base of transistor Q4 will cause transistor Q4 to become conductive and transistor Q3 to become non-conductive for a preselected interval, preferably about one second during which pulses may be supplied by pulse generator 26 for purposes described more fully hereinbelow. Potentiometer R14 may be adjusted for varying such time delay interval. The collector of transistor Q3 is connected by means of a lead 33 with a relay driver circuit 35. Accordingly, it may be seen that the output lead 33 provides a pulse-form signal having a typical voltage characteristic 36. Additionally, the collector of transistor Q3 is connected by circuit lead 38 to a further monostable multivibrator circuit 39, to be described.

Relay driver circuit 35 comprises an NPN transistor Q5 having the winding 41*w* of a reed relay 41 interconnected between its collector and the power supply lead 28, there being the usual transient suppression diode D2 connected thereacross. Normally closed contacts 41*k* of the reed relay are operated upon energization of the winding 41*w* for purposes more fully apparent from the following description. The emitter of transistor Q5 is biased through a resistor R16 to ground lead 27, there being a further bias resistor R17 interconnected between power supply lead 28 and the emitter of transistor Q5. Accordingly, when a signal is provided via input lead 33 through a resister R18 connecting such lead to the base of transistor Q5, transistor Q5 is rendered conductive for causing energization of winding 41*w* for the period during which the input signal is provided, i.e., typically one second.

Monostable multivibrator circuit 39 comprises a pair of NPN transistors Q6,Q7 whose emitters are commonly interconnected to the circuit ground lead 27 via a common emitter resistor R20 and with the emitter of each of these transistors being connected through respective resistors R21,R22 to power supply lead 28. The base of transistor Q6 is selectively biased to power supply lead 28 via a potentiometer R23 for selectively controlling together with capacitors C7,C8 or C9, the time interval of a cycle of operation of the multivibrator. The collector of transistor Q6 is interconnected with the base of transistor Q7 through a resistor R24 and the base of transistor Q7 is biased to lead 27 through a further resistor R25.

Interconnecting the base of transistor Q6 with the emitter of transistor Q7, for feedback coupling purposes, is a circuit comprising a manually preselectable three-position switch 42 having connected with it three capacitors C7,C8, and C9 of different sizes for determining a length of time of operation during which the output of monostable multivibrator circuit 39. When the monostable multivibrator 39 is rendered operative by an output signal from the monostable multivibrator 32 via output lead 38, such lead is interconnected with a coupling capacitor C11 which is adapted to couple the signal provided via lead 38 through a diode D3 to the base of transistor Q7, for causing the latter to become conductive, it being understood that transistor Q6 is, under these circumstances, non-conductive. It may be noted that respective resistors R27,R28 connect the opposite sides of capacitor C11 to the circuit ground lead 27 for obvious filtering and bias purposes.

The output of monostable multivibrator circuit 39 is provided via a lead 43 through a resistor R29 of a relay driver circuit 44. Such circuit includes an NPN transistor Q8 having its emitter connected through a resistor R31 through the circuit ground lead 27 and through a resistor R32 to the circuit power supply lead, all for voltage biasing purposes. The collector of transistor Q8 is interconnected with the winding 45*w* of a reed relay 45 having a set of normally open contacts 45*k*, there being the customary transient suppression diode D4 connected across such winding. Accordingly, when the collector of transistor Q6 of monostable multivibrator circuit 39 is high, constituting an output signal, which signal is provided via resistor R29 from output lead R23 to the base of transistor Q8, the latter becomes conductive for energizing reed relay winding 45*w* and closing contacts 45*k*. Such contacts are interconnected via a circuit lead 47 with which coupling capacitor C3 of pulse generator 26 is connected. The other side of relay contacts 45*k* are connected through a circuit lead 48 to relay contacts 41*k*, whereby pulses from pulse generator 26 are provided by circuit lead 48 to relay contacts 41*k* during the interval during which reed relay contacts 45*k* are closed.

Therefore, the purpose of different capacitor sizes C7, C8, and C9 for effecting the pulse duration during cyclic operation during monostable multivibrator circuit 39 is manifest. Depending upon the position of switch 42, a different one of these capacitors will cause the monostable multivibrator circuit to stay in its switch state for a different interval, preferably such intervals being such as to allow one, two, or three pulses to be provided via pulse generator 26 through relay contracts 45*k*.

In accordance with this invention, the number of pulses thus provided may be preselected by the officer for providing different preselected signals or message information to be received by civilian vehicles, as more fully explained below.

In operation, it will be seen that operation of pushbutton sections *22a,22b* will cause microphone 21 to be disconnected from audio frequency amplifier 20 and pulses will be provided by pulse generator circuit 26 not only to monostable multivibrator circuit 32 for initiating a time interval, during which relay contacts 41*k* will be closed for connection of output lead 48 from relay contacts 45*k* with the input lead 24 to the audio frequency amplifier 20, but also monostable multivibrator circuit 39 will be operative, depending upon the position of switch 42, to permit one, two, or three (or other predetermined number of pulses) to be provided from pulse generator circuit 26 through relay contacts 45*k*. Thus, a predetermined number of pulses will be applied to audio frequency amplifier 24 to modulate the carrier signal of the transmitter, which is transmitted by antenna 18 from the vehicle which is equipped with system 11.

The first position of switch 42 may permit but a single pulse to be transmitted and this may designate a warning condition. The second position of switch 42 may permit two pulses to be transmitted, and this may signal an emergency or other more serious condition to be signalled to others from the vehicle equipped with system 11. A third position of switch 42 may permit three pulses to be transmitted for causing vehicles equipped with receivers which are responsive to such signals to operate in a mode which they will receive voice communications resulting from operation of transmitter circuits 13, in which event the officer utilizing the vehicle which is provided with system 11 may speak into microphone 21 for such purposes.

But the number of pulses of a pulse pattern resulting in pulse modulation of the transmitted carrier wave is merely representative, and various numbers of pulses in various pulse patterns are possible. Thus, the specific form of coding of the transmitted signal is not to be limited by the merely illustrative use of one, two, or three or more pulses. Yet, it is nevertheless preferred that the transmitting system provide transmission of either tone or interrupted carrier wave (ICW) pulse coding within a very short signalling interval, i.e., about one second or less, so that voice transmission may be commenced promptly upon receiving vehicles responding automatically to the transmitted coding (i.e., pulse pattern) signals.

Figure 2:
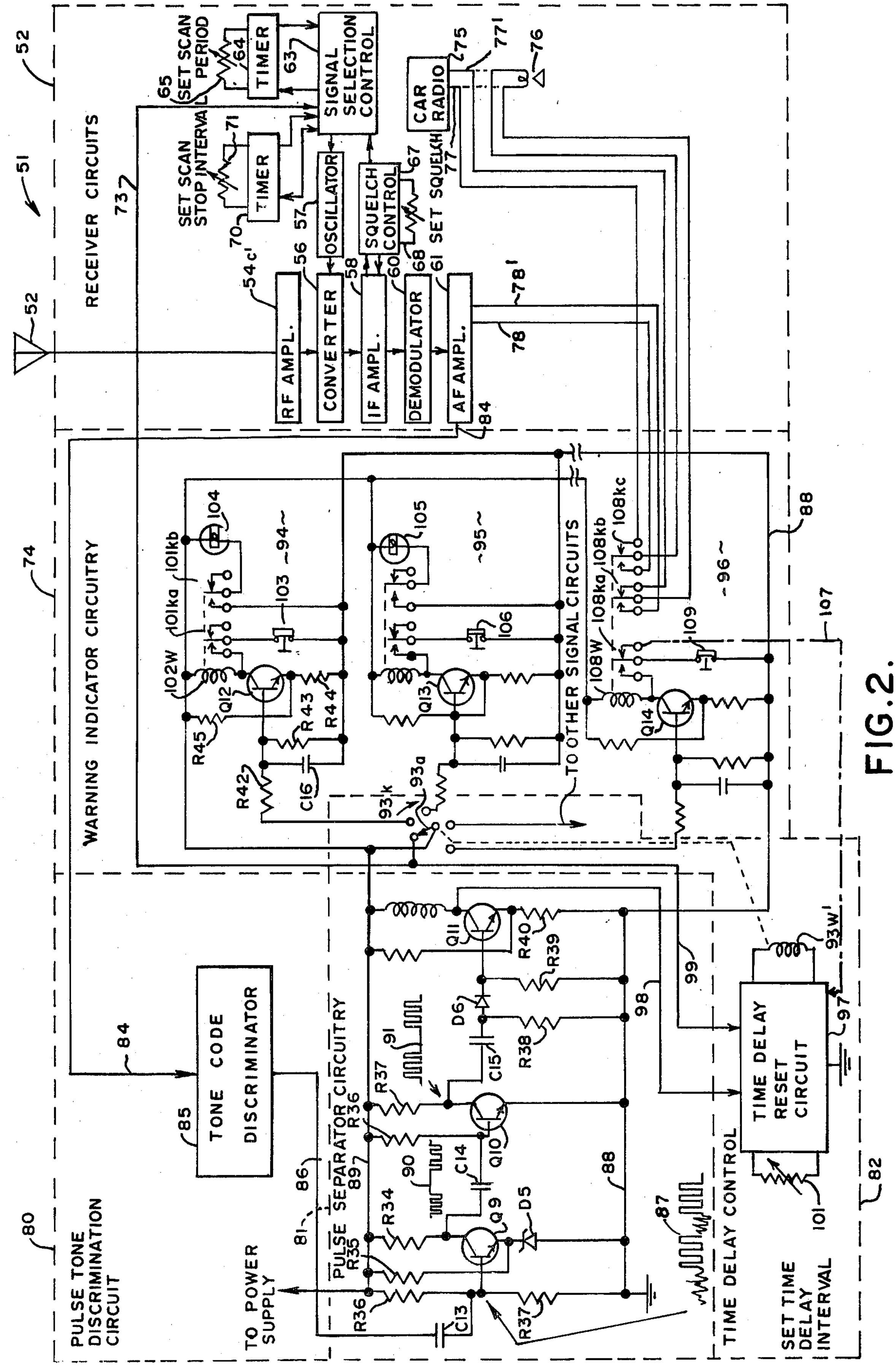
FIG. 2 is a schematic diagram illustrating receiving circuitry of the electronic traffic control and relief system.

Referring now to FIG. 2, there is illustrated receiver circuitry which is responsive to the pulse-modulated signals provided by system 11. The receiver system is designated 51 in its entirety and will be understood to be carried by each of numerous civilian vehicles. In accordance with the invention, it is not only possible but intended to readily equip civilian vehicles with a receiver system 51 at a low cost and without complication, whereby each of such vehicles will receive the radio signals transmitted from a police vehicle, portable transmitter unit or any of various authorized mobile units equipped with a transmitting system of the invention when said civilian vehicles are within at least the general vicinity (i.e., hundreds of meters or even a number of kilometers) of the transmitting mobile unit.

A receiver system 51 of the invention comprises an antenna 52 for receiving the modulated carrier transmitted by transmitter system 11. It will be readily understood, such antenna 52 of the receiving system may be a small whip-type antenna which protrudes from the vehicle carrying the receiving system. Such antenna 52 is interconnected with receiver circuits 52 which, though modified in accordance with the invention, are of essentially conventional configuration adapted to provide demodulation of an audio modulated radio frequency carrier within the given band and thus to retrieve the audio signal impressed upon the carrier received by antenna 52. The signal picked up by antenna 52 is provided to a broad-band radio frequency amplifier 54. The latter is of broad-band type capable of amplifying transmissions within a relatively broad band substantially coincidental with the police band in which transmitting system 11 is capable of transmitting. For example, amplifier 54 is adapted to amplify a signal within a police band such as 152–162 MHz, which is within the high VHF band (i.e., 146–174 MHz) or any other police band such as the low VHF band (46–50 MHz) or in the UHF band (450–500 MHz) previously noted. For economy and to provide for reception over substantial distances, it is especially preferred that the high VHF police band be utilized by both transmitting system 11 and receiving system 51.

Signals amplified by radio frequency amplifier 54 are provided to a converter 56 of essentially conventional configuration to which is interconnected a local oscillator 57 which is selectively controllable to provide a signal which, when mixed by the converter 56 with the signal amplified by radio frequency amplifier 54, will provide an intermediate frequency which is supplied to an IF (intermediate frequency) amplifier 58 in a manner shortly to be understood. The signals provided by the IF amplifier are fed to a demodulator 60 of the conventionally available type adapted to provide the demodulated tone or other audio signals impressed upon the carrier received by antenna 52. Such demodulated information is made available to an AF (audio frequency) amplifier 61 for further purposes in accordance with the invention.

Interconnected with IF amplifier 58 and with oscillator 57 is a signal selection control 63. Such control is adapted to cause the frequency provided by oscillator 57 to vary within a preselected range whereby the receiving circuits just described are effectively tuned over the entire police band (such as the high VHF police band of 146–174 MHz) which is especially preferred so as to effectively provide the capability of scanning the frequency band. For this purpose, signal selection control circuit 63 may be a convention circuit for providing a voltage which varies within preselected limits, with voltages provided to oscillator 57, which may be a voltage control type of oscillator (VCO). For this purpose, it is preferred to utilize a timer 64 of conventional type for causing the signal selection control 63 to provide such variation of voltage within a given period of time so as to provide a given scan period which may be set by means such as a variable resistance indicated at 65. The latter, therefore, effectively acts as a scan rate control. It is preferred to provide for a scan rate which is of a very short interval to ensure that any signal transmitted within the police band having a modulated carrier which is to be received by receiving system 51 and decoded by the receiver circuit 52 will be tuned and picked up. For example, such scan period may be a few seconds or less, and possibly even less than a second.

Signal selection control circuit 63 is interconnected with RF (radio frequency) amplifier 58 through a squelch control 67 of convention type, there being a variable resistance as indicated at 68 for setting the squelch level provided by such squelch control. Depending upon such level, the system may be made to respond to received signals having a signal strength of only greater than a predetermined value; e.g., a few tenths of a millivolt, whereby the receiving system 51 will not be responsive to spurious signals, so-called "skip" transmissions, of those having such low signal strength, such as, for example, harmonies, test signals, etc., that they should properly be disregarded by the system. However, it is preferred that such squelch level set by control 68 be such as to ensure the detection of even relatively low power transmissions within a given area, assuming the same to be of valid significance, e.g., a signal transmitted from a police vehicle in the vicinity of a vehicle carrying such a receiving system 51 which is obscured by terrain whereby the signal may be of less strength than would ordinarily by the case. However, by proper selection of squelch adjustment means 68, proper response of the system can be had to avoid detection of undesirable, spurious or very low power transmissions which it is not desired to detect.

Squelch control circuit 67 also provides the function of causing signal selection control circuit 63 to cause scanning to stop upon detection of a signal of predetermined strength. When such scanning stops, further scanning is delayed for an interval determined by a commercially available timer 70 having connected therewith a variable resistance 71 or other means for setting the scan stop interval. Such scan stop interval is broadly preferred to be from a few seconds up to very approximately one-half minute, and more specifically preferably to be 5–20 seconds, whereby scanning will be terminated for such interval to permit circuitry of the invention to decode information and give signals in response thereto when pulse modulated carrier is received by the receiving system. At the end of such stop intervals, timer 70 will permit signal selection control 63 to cause the receiving circuitry to resume scanning.

A circuit connection 73 is also made with other portions of the system for the purpose of providing a signal to the signal selection control circuit 63 for causing scanning to resume upon the resetting of certain warning/indicator circuitry 74 of the system, all described more fully hereinbelow.

While still referring, however, to the receiver circuits 52, attention is directed to a conventional car radio 75 which typically may be present in a vehicle provided with system 51, such car radio forming no part of the invention but making available a loudspeaker 76 thereof for utilization with the present system. Thus, it is to be understood that such loudspeaker 76 is normally interconnected by circuit leads 77, 77' as represented by dashed lines, to the car radio. However, such leads 77, 77' are broken for the purpose of providing connection of loudspeaker 76 to the output of AF amplifier 61 via output leads 78, 78' thereof as explained more fully hereinbelow.

In addition to the warning/indicator circuitry 74, the receiving system 51 also includes pulse tone discriminator circuitry 80, pulse separator circuitry 81, and time delay control circuitry 82, which is now to be described.

The output of AF amplifier 61 is also provided by a lead 84 to a tone code discriminator 85 which is optionally provided for the purpose of causing the circuitry of the receiving system 51 to be responsive only to tones of one or more simultaneous or sequential tones of predetermined frequency, such being of a conventional type as heretofore utilized in telephonic equipment and other tone-responsive circuits. However, the use of said tone code discriminator 85 is optional. In the event that it is not necessary for receiving system 51 to be responsive only to tones of the preselected frequency, said discriminator 85 may be eliminated, whereupon signals are directly transmitted from AF amplifier 61 via lead 86. The latter supplies the amplified demodulated signal, which may consist of various audio frequencies as well as tones which are to be separated, to pulse separator circuitry 81 via a coupling capacitor C13 of the pulse separator circuitry.

The pulse separator circuitry comprises a first NPN transistor having its emitter biased with respect to a circuit ground lead 88 via a zener diode D5, the base of which transistor receives the capacitor-coupled signal lead 86. The emitter of such transistor is connected through a voltage supply lead 89 via a resistor R34 and the cathode of diode D5 is referenced to such voltage supply lead 89 via a further resistor R35. The base of transistor Q9 is biased by a pair of resistors R36, R37 in conventional fashion. In accordance with the invention, the zener diode voltage is preselected to be slightly less than amplitude of the pulses at this stage of the circuitry whereby transistor Q9 conducts only when the signal coupled through the capacitor C13 reaches a voltage nearly equal to the pulse voltage, such being higher than any audio signal or any noise, regardless of whether generated by the receiver circuits or received via antenna 52, which may be present on lead 86. Hence, this stage of the pulse separator circuitry effectively separates the pulses from any noise or audio signal, and the signal present at the collector of transistor Q9 is constituted by the tops of any pulses which pass through tone code discriminator 85 as a result of the tone pulse modulated carrier received by system 51. The signal at the collector is as represented by the voltage characteristic designated at 90, the input signal to circuit 81 being shown at 87. Voltage supply lead 89 may be connected to a positive source of DC voltage suitable for powering such semiconductive circuitry, e.g., the vehicle battery at, for example, positive 12 VDC.

Such signal present at the collector of transistor Q9 is provided to a coupling capacitor C14 to a further NPN transistor Q10 connected in common emitter configuration, the base of which is biased to the voltage supply lead 89 to a resistor R36 and the emitter of which is connected to such lead through a resistor R37. This transistor, therefore, provides an inversion of the signal provided to its base and amplifies the same to provide at its collector a signal having a typical voltage characteristic shown at 91.

Such signal is provided by coupling capacitor C15 and thence through a diode D6, both the cathode and anode of which are tied to ground through respective resistors R38, R39 whereupon the thus isolated amplified pulse form signal is provided to the base of a further NPN transistor Q11, the emitter of which is connected through a resistor R40 to the circuit ground lead 88 and through a resistor R41 to the voltage supply lead 89. Interconnected between the collector of this transistor and voltage supply lead 89 is the winding 93*w* of a stepping relay having a plurality of contacts respectively designated 93*k* which are adapted to be sequentially contacted by a wiper arm 93*a* upon repeated energization of winding 93*w*, for purposes presently appearing.

As will be apparent, each time a signal of sufficient magnitude, i.e., representing one of the pulses of the wave form characteristic 91, is provided to the base of transistor Q11, the latter conducts to cause energization of relay winding 93*w*, producing such stepping action as described.

Relay wiper arm 93*a* is interconnected with voltage supply lead 89, whereupon stepping action of the arm as winding 93*w* is energized will sequentially cause the voltage present on lead 89 to be provided by arm 93*a* to the individual relay contacts 93*k* in sequence.

Such contacts 93*k* are each interconnected with a respective one of individual warning/indicator circuits which collectively provide circuitry 74 for warning and indication purposes.

Three such warning/indicator circuits 94, 95, and 96 are shown. However, before describing such circuits, it is important to observe that the time delay control 82 is provided having a conventional time delay circuit 97 which is interconnected by means of a circuit lead 98 with the collector of transistor Q11 and connected by means of a further circuit lead 99 with a first one of relay contacts 93*k*. Said time delay reset circuit 97 is provided for the purpose of energizing a reset winding 93*w*' adapted to cause relay wiper arm 93*a* to reset or be moved to a so-called home position when such winding 93*w*' is energized. For this purpose, circuit 97 is adapted to begin timing out a time delay interval in response to change in the voltage on lead 98 when transistor Q11 becomes conductive for causing winding 93*w*' to be periodically energized for stepping wiper 93*a* around contacts 93*k* until it reaches the position shown in which no further energization of reset winding 93*w*' is provided. After timing out the time delay interval, circuit 97 begins to energize 93*w*' repeatedly for causing wiper arm 93*a* to be sequentially advanced until it reaches the position shown, at which the voltage present on voltage supply lead 89 is available by wiper arm 93*a* to circuit lead 99 for causing circuit 97 to cease energization of winding 93*w*'. Lead 73 interconnects the relay contact to which wiper arm 93*a* is shown to be in contact with signal selection control circuit 63 for the purpose of permitting signal selection control circuit 63 to permit receiver scanning only when relay wiper arm 93*a* is in the position shown but otherwise preventing scanning.

Turning now to the warning/indicator circuitry 74, the two individual warning/indicator circuits 94, 95 are each seen to be of an identical character. Additional such circuits may be employed. But, only circuit 94 will be described in detail. The same comprises a resistor R42 interconnecting the circuit with the first one of relay contact 93*k* for providing the voltage present on voltage supply lead 89 to the base of an NPN transistor Q12 upon the relay wiper arm 93*a* coming into such relay contact. A capacitor C16 and resistor R43 are interconnected between the base of transistor Q12 and a lead which will be seen to be of the circuit ground as represented by circuit lead 88. Resistors R42, R43 and capacitor C16 provide a time delay network for permitting sufficient base drive from being provided to transistor Q12 for causing it to become conductive during the interval of switching by relay arm 93*a*. The emitter of transistor Q12 is interconnected with such lead by means of a resistor R44 and with voltage supply lead 89 by means of a further resistor R45. Interconnected between the collector of transistor Q12 and voltage supply lead 89 is the winding 102$w$ of a relay having sets of contacts 101$ka$, 101$kb$ each of a single pole, double throw character. One such set of contacts 101$ka$ is interconnected through a pushbutton switch 103 to circuit ground lead 88, such pushbutton switch 103 being of a normally closed character for setting up a latching circuit for maintaining the energization of relay 102$w$ of when transistor Q12 becomes conductive in response to conduction of transistor Q12, causing relay contacts 101$ka$ to be moved from the position shown, thereby setting up a latching circuit for maintaining the conduction of said relay winding 102$w$ until pushbutton switch 103 is operated. The other set of relay contacts 101$kb$ is interconnected in a series with a flashing indicator light 104 of the type adapted to provide flashing illumination when energized. As will be apparent, when relay winding 102$w$ is energized as just described, relay contacts 101$kb$ will be moved from the position shown to provide a connection above flashing indicator light 104 between the voltage supply lead 89 and circuit ground lead 88. Such conductive circuit will be maintained so long as relay contact 102$w$ remains energized. Flashing illuminator means 104 may be replaced or augmented with an audible or buzzer-type signal of electromechanical or electronic nature as are presently available. Thus means 104 may represent either a visual or audible warning device, or both.

The circuitry of warning/indicator circuit 95 will be seen to be identical, there being similarly a warning means 105 adapted to be energized upon conduction of a transistor Q13, such energization remaining until resetting is effected by a pushbutton switch 106.

Preferably, warning devices as constituted by visual indicators 104, 105 are located in front of the driver of a vehicle equipped with system 51 whereby the attention of the driver is immediately commanded upon flashing indication by such devices 104, 105. If the latter are supplemented by or constitute audible alerting devices, such indicators necessarily need not be in front of the driver, but might be located where they may readily be observed if an audible indication is heard by the driver of the vehicle. It is preferred that such indicators 104, 105 be of different colors, such as red and yellow, for example, whereby different colors may indicate different warning conditions of which it is desired to apprise the driver.

Only two such warning/indicator circuits preferably having flashing visible indicator devices are shown, but is suggested by the drawings, additional drawings may be provided so that numerous different colors of indicator lights could indicate various types of conditions of which it is desired to apprise drivers.

Warning/indicator circuit 96 is seen to comprise a substantially identically connected NPN transistor Q14 adapted for energizing a relay winding 108$w$ having three sets of contacts 108$ka$, 108$kb$, and 108$kc$. Pushbutton reset switch 109 is interconnected with relay contacts at 108$ka$ for establishing a latching circuit for the relay winding, such pushbutton being operable for deenergizing the winding for reset purposes when it is desired to return the circuit to its reset mode. Relay contact sets 108$kb$, 108$kc$ are interconnected with the respective output leads 78, 78' of audio frequency amplifier 61 whereby, when relay winding 108$w$ is energized, such leads are interconnected with radio speaker 76 and interrupting the normal connection of the speaker with the conventional car radio speaker leads 77, 77'.

Operation of the warning/indicator circuitry in response to reception of pulse encoded or ICW signals from transmitting system 11 is seen as follows:

If a single tone pulse is passed by tone discriminator 85 to pulse separator circuitry 81, the same is separated by the latter and amplified to produce energization of relay winding 93$w$ for the interval of the pulse. This advances wiper arm 93$a$ to the first position, providing voltage to warning/indicator circuit 94. After a short time delay adequate to ensure that the wiper arm 93$a$ has come to a stop in this position, transistor Q12 is rendered conductive for energizing relay winding 102$w$, whereby causing indicator means 104 to begin providing flashing illumination. Such may be constituted by a yellow flashing light visible to the driver of the vehicle equipped with system 51 indicating, for example, that the driver should be alert for a dangerous condition, or the need to take precautionary measures of an appropriate type. Thus, if he is traveling at normal speed, the driver is warned to reduce speed in order to deal with a contingency ahead of the vehicle.

If two pulses are utilized to modulate the carrier received by the system and passed by tone code discriminator 85, the same are separated by pulse separator circuitry 81 causing relay winding 93$w$ to be energized twice for making two steps of wiper arm 93$a$. This results, in the same manner as described above, in the energization that indicator means 105. The latter may supply red flashing illumination indicating an extremely dangerous circumstance indicating to the driver that he should bring the vehicle to a halt or leave the road, as, for example, to permit an emergency vehicle to pass or to prevent running into the scene of an accident. Other color combinations, including alternating colors may be used for signalling in this manner.

It may be noted that because of the time delay feature of each of the warning/indicator circuits, only the proper warning/indicator circuit corresponding to the compact position at which wiper arm 93$a$ ultimately stops will be energized.

Similarly, if three pulses are provided, the resultant energization of relay winding 93$w$ will advance wiper arm 93$a$ to the third terminal position, causing energization of transistor Q14. This results in energization of relay winding 108$w$ whereupon contacts 108$kb$ and 108$kc$ interconnect the car radio speaker 76 to the output of audio frequency amplifier 61 via leads 78, 78'. If then further voice modulation of the police frequency signal currently received by the system takes place, this audio signal will be demodulated and passed to AF amplifier 61 for amplification and will then be presented within the vehicle by means of loudspeaker 76.

It is to be observed that because of connection 73 to one contact at which wiper arm 93$a$ normally contacts, scanning is terminated where relay wiper arm 93$a$ is stepped from the position shown. This prevents scanning from resuming until the wiper arm is returned to the position shown. However, it should be understood that the signal selection control 63 of the receiving circuits causing tuning to stop immediately upon the detection of a signal of sufficient strength, as determined by squelch control circuit 67. Thus, scanning has already been terminated but may not be resumed, even though timer 70 may have timed out because of the connection to relay contact 93$k$ with which wiper arm 93*a* is shown interengaged. Therefore, the receiving circuitry will remain tuned to permit the system to continue receiving information, such as voice information as the type just described notwithstanding the time interval of such voice transmission which may be considerably in excess of the scan stop interval determined by timer 70.

On the other hand, only a reasonable time is necessary for the transmission and reception of a voice transmission of this type. Therefore, it is desirable to return the circuit to a reset condition after a sufficiently length interval that any normal message may have been received. For this purpose, time delay reset 97, after the delay interval established by control 101, will provide energization of reset relay winding 93*w'* to cause wiper arm 93*a* to advance once more to the position shown. This occurs even if the operator of the vehicle has failed to reset the appropriate warning/indicator circuit. For example, if upon termination of the voice message received upon operation of warning/indicator circuit 96, which effectively connects the radio speaker to audio frequency amplifier 61, resetting action of wiper arm 93*a* will permit the circuit to respond once more by allowing scanning to resume and by permitting the circuitry to energize the appropriate warning/indicator circuit, as required. Optionally, a connection 107 with contacts 108*ka* will disable time delay circuit 97 to prevent such resetting when a voice message is received. Normally, of course, it could be expected that the driver will cause the warning/indicator circuit 94, 95, or 96 to be reset manually by depressing reset pushbutton 103, 106, or 109, respectively, after the intelligence to be derived from the signal thus presented has been understood by the driver.

Referring now to FIG. 6, there is illustrated at 110 a circuit for causing automatic transmission of radio frequency signals within a police band by transmitting system 11 in response to abrupt or abnormal acceleration of a vehicle equipped with the system in the event of a collision or other accident imposing upon the vehicle an abnormal acceleration. For this purpose there is provided a suitable enclosure having therein a small mass of conductive material, such as a metal ball 112 mounted in a position of stability upon the pedestal 113 and normally retained in such position by the pressure of a compression spring 114 which presses the mass or ball 112 against the pedestal 113. Provided at opposite ends of the enclosure, which is shown to be non-conductive for this purpose, are electrodes 115. Although only two such electrodes are shown, additional electrodes may also be provided on opposite sides of ball 112. A space is provided between electrodes 115 and ball 112 whereby the ball is maintained out of electrical contact with such electrode so long as it occupies its stable position on pedestal 113. Each of the electrodes is interconnected by means of a circuit lead 117. Another electrical connection is provided by a lead 118 with a pedestal 113, whereby lead 118 is maintained at all times in contact with the conductive metal ball. Leads 117, 118 are interconnected with a commercially available or conventional latch circuit 120 which is provided with a source of suitable DC voltage, e.g., the vehicle power supply, by means of a lead 121, a further lead 122 providing a connection with circuit ground. Latch circuit 120 is wired so that, when a circuit is completed between leads 117, 118, latch circuit 120 will be operative to provide a conductive circuit across a pair of output leads 124, 124'. For purposes of utilization of the circuitry of FIG. 6, leads 124, 124' are connected across the terminals of switch section 22*b*. Preferably latch 120 also contains a timing device which periodically, e.g., every few seconds or minutes, but only momentarily interrupts the conductive circuit across leads 124,124'.

Enclosure 111 is mounted within the vehicle in which system 11 is equipped in a fixed relationship to the chassis or other structure of the vehicle whereby if the vehicle is subjected to abnormal relatively large accelerations, i.e., in excess of those to which a vehicle may normally be expected to receive, ball 112 will be dislodged from its position of stability shown to contact one of the electrodes 115. This will establish electrical conductivity between such electrode and pedestal 113, causing latch 120 to establish and maintain electrical conductivity between leads 124,124'. From the previous description of pulse generator circuit 26, it will be understood that, because of the connection of leads 124,124' across pushbutton switch section 22*b*, a circuit connection will be provided between leads 30,31 of the circuit for causing a tone to be provided by relay contacts 41*k* to audio frequency amplifier 20 for ultimate transmission by antenna 18. Such circuit is periodically re-established by operation of latch means 120. In this way, a vehicle equipped with system 11, with such system additionally including the acceleration responsive circuit of FIG. 6 is equipped to provide automatic transmission on a continuously repeated basis by a tone pulse modulated signal in a police frequency band whereby the same may be received by police vehicles within the receiving range of the vehicle equipped with transmitting system 11 as well as civilian vehicles within such receiving range which are equipped with receiving system 51. However, even though such alerting signal is repeatedly given at intervals, the transmitting frequency is not tied up continuously.

The invention is more fully described and illustrated as to its features and operation by the following examples:

EXAMPLE I

Figure 3:
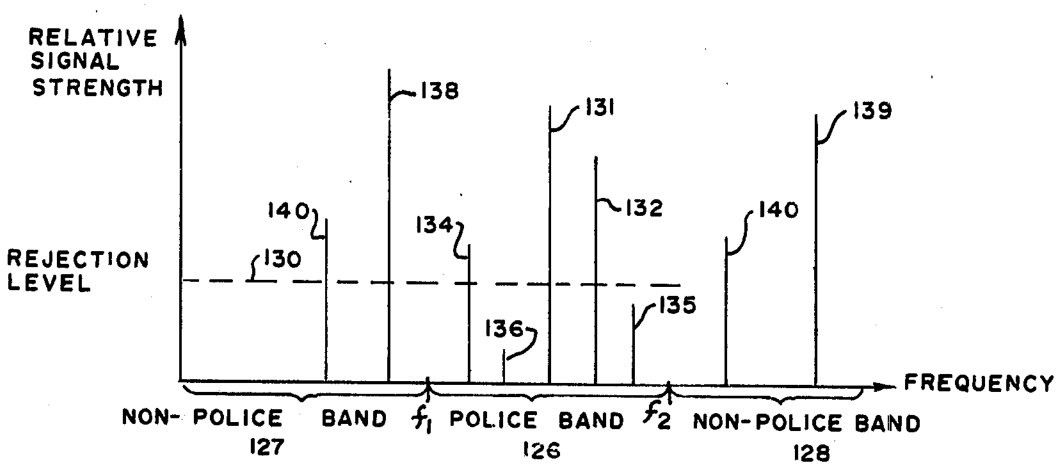
FIG. 3 is a frequency spectrum diagram in which relative signal strength is plotted as a function of frequency for the purpose of illustrating the transmission of frequencies carried out in the operation of the new electronic traffic control and warning system.

Referring to FIG. 3, a plot of relative signal strength of various signals is plotted as a function of the frequency at which such signals are transmitted within a VHF police band bounded by two frequencies $f_1$ (such as 146 MHz) and $f_2$ (such as 174 MHz), such police band being designated 126 as well as two non-police bands 127,128 adjacent the lower and upper limits of such police bands, respectively. At 130 is designated a rejection level at which a receiving system 51 constructed in accordance with the invention is set to reject signals received within the police band 126 to which receiver circuits thereof are adapted to be receptive, as by setting a squelch level by means of control 68 whereby the circuitry will fail to cause scanning to terminate at a frequency having a relative signal strength below such rejection level.

Upon the transmission of a VHF signal such as that indicated at 131 by means of the operation of a conventional police vehicle transmitter within the relative vicinity, i.e., within a few hundred meters or even a few kilometers two or three kilometers from a vehicle or other location equipped with a receiving system 51 of the invention, the same is received by an antenna 52 of receiving system 51 with an apparent relative signal strength as indicated which is seen to be well above rejection level 130. Accordingly, scanning by receiver circuits 52 of the system terminates whereby circuitry is effectively tuned to signal 131, which merely may be that utilized for routine communication purposes. Scanning is terminated momentarily for a period of time sufficient to enable pulse tone discrimination circuit 80 and pulse separator circuit 81 to determine that such signal 131 is pulse modulated by a tone of the proper frequency resulting in operation of one of the warning-/indicator circuits 74 of the system. If not, scanning is permitted to resume, in response to timer 70, to tune other frequencies within band 126, i.e., between frequencies $f_1$ and $f_2$ at a rate determined by scan period timer 64.

Upon reception of a signal such as that indicated at 132, scanning is again terminated for a period adequate to determine whether such received signal is pulse modulated with tones to which receiving system 51 is responsive. If so, pulse separator circuitry separates the pulses from the received signal to cause energization of relay winding 93*w* by a predetermined number of times corresponding to the number of pulses received, resulting in the operation of one of warning/indicator circuits 74. For example, such signals are transmitted by selective actuation of switch section *22a,22b* of transmitting system 11 by the police officer whose vehicle is equipped with such system, the number of pulses being transmitted being determined by the setting by such officer of switch 42 in accordance with the desired type of signal to be given, a general warning, specific warning, or need to talk directly to a civilian vehicle equipped with receiving system 51. In this way, the driver of such civilian vehicle is provided with a visual or audio/visual signal, or receives direct voice communications from the officer within the police vehicle equipped with such transmitting system 11.

For such direct voice communication purposes, microphone 21 of the conventional transmitter circuits of the police vehicle is utilized by the officer. To illustrate, a highway patrol officer, rather than using flashing lights and/or a siren, preselects a position of switch 42 corresponding to direct voice communications to the motorist ahead of him and actuates pushbutton switch sections *22a,22b* to cause a signal to be transmitted which is modulated with a predetermined number of tone pulses while, at the same time, disabling for the moment microphone 21 to prevent audio signals from being impressed upon such pulse modulation signals. Upon releasing such pushbutton switch, pushbutton switch 23 on microphone 21, which remains depressed, now enables direct voice modulation of the transmitter circuits to be normally carried out. Thus, as the officer presses microphone button 23, the radio speaker within the civilian vehicle hears a voice saying, "This is the highway patrol with a vehicle safety notice for the blue '77 Ford immediately ahead." The officer informs the driver of a tire low in pressure or perhaps advises the driver to pull over as soon as it is possible to do so safely.

By such calm, orderly, non-disruptive communication process, the shattering effect on the nerves of other motorists, as well as the apprehended driver, which otherwise would occur in response to flashing lights and a screaming siren which approaches such vehicles is entirely avoided. The operators of other vehicles receiving such signals know immediately that the transmission is not intended for them and may safely continue upon their travels without having to ask themselves, "I wonder if I did it?" or, "Should I pull over, slow down, stop or what?" and without panicking.

Even a remotely transmitted signal, such as that indicated at 134, such as transmitted from a central headquarters many, many miles from a vehicle equipped with receiving system 51 will be well above rejection level 130. However, signals such as that indicated at 135 which may be the effect of a "skip" transmission hundreds of miles away and having no significance for the driver of a vehicle equipped with receiving system 51 are properly rejected by the circuitry thereof. Perforce, spurious signals such as that indicated at 136 are easily rejected.

Outside police band 126, even extremely powerful signals such as those indicated at 138,139 have no effect upon the system as they are not tuned by receiver circuits 52. These and many other signals such as those indicated at 140 are not tuned by a receiver circuit 52 of a receiving system of the invention and are properly ignored by the system.

EXAMPLE II

Figure 4:
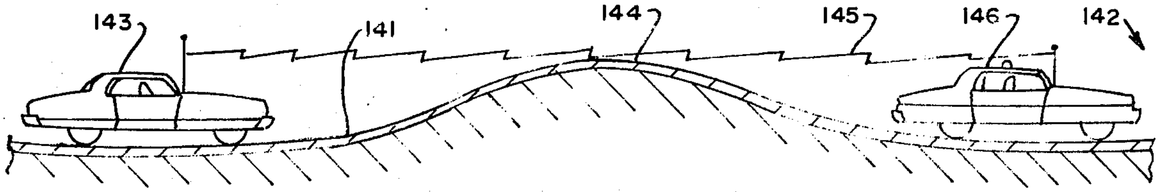
FIG. 4 is a pictorial diagram illustrating transmission of encoded radio frequency signals for traffic control and warning purposes from a vehicle involved in a collision to a remotely located receiver-transmitter for transmission thereof to other vehicles in the vicinity and to a more remotely located receiver.

The tremendous value of direct voice communication and consequent use of such communication to provide direction from a police officer from his vehicle to a driver of a civilian vehicle is an important factor in the prevention of collisions which daily plague our highways as illustrated by imagining oneself to be a motor vehicle operator in this situation: Referring to FIG. 4, an accident has occurred on a highway 141 in a location as indicated in the direction shown by an arrow 142 which is obscured from the view of a motorist in his vehicle 143, such vehicle being equipped with a receiving system 51 of the invention. The view of the accident is obscured to such driver by a hill 144 or other geographical feature or weather blocking his observation of the highway ahead, but it is presumed that at the time of cresting the hill 144 (or by the time he passes the curve, rain, or fog, etc.) that insufficient distance will be provided between vehicle 143 and location 142 of the accident that a collision may not be averted. However, it is assumed that a police vehicle 146 has arrived upon the scene of the accident and is positioned upon highway 141 in advance of the accident. Such police vehicle 146 is equipped with the transmitting system 11 of the invention. A police officer in such vehicle 146, by operation of transmitting system 11 therein in the manner previously described, involving preselection by means of switch 42 of a predetermined pulse modulation code for causing direct voice communication with a vehicle provided with receiving system 51, and by further use of microphone 21, provides a message which is transmitted to each approaching vehicle, as representatively illustrated at 145, even though the accident at location 142 or the police vehicle 146 has not come into the sight of the driver of such vehicle 143. This message, which may be continuously repeated, is received by the drive vehicle 143 and by drivers of all other similarly equipped vehicles within the transmitting range of police mobile unit or vehicle 146. This provides the drivers of such receiving vehicles with more than adequate warning and distance in which to slow their vehicles and to stop the same without hazard to themselves, to vehicles involved in the accident, or to other emergency vehicles such as police unit 146. Thus, vehicles approaching the scene of the accident are diverted or stopped well in advance of the accident without danger.

EXAMPLE III

Figure 7:
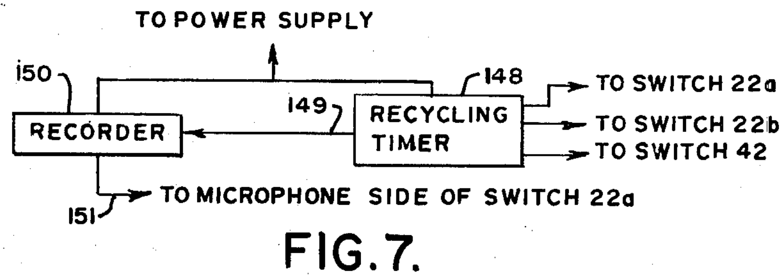
FIG. 7 is a schematic circuit diagram of circuitry for causing automatically repeated operation of the transmitting circuitry of FIG. 1.

Location 142 is assumed not to be an accident scene but instead a hazard point such as a narrow bridge, dangerous intersection, temporary construction site, or the like. Rather than a police vehicle 146, a mobile unit in lieu of vehicle 146 but containing transmitting system 11 is placed where the vehicle is shown. Referring to FIG. 7, the transmitting system may be modified by the provision of a timer 148 of an electrical, electromechanical, or mechanical type adapted to be provided with power from the same supply as that utilized for powering the circuitry of system 11. Timer 148 is interconnected, as shown, with pushbutton switch section *22a,22b* and with selector switch 42, for the purpose of periodically actuating such switches in predetermined fashion to cause the transmitting system periodically to initiate the transmission of a pulse modulated radio frequency signal within the prescribed band, which transmission is received by a receiving system 51 as previously described. Accordingly, at the intervals determined by timer 148, transmitting system 11 re-initiates transmission of pulse modulated signals for alerting the drivers of vehicles equipped with receiving system 51.

Advantageously, transmitting system 11 may be modified by the provision of a recorder 150 adapted to be interconnected through pushbutton switch section *22a* with audio frequency amplifier 20, such recorder having a recorded voice message to be transmitted to civilian vehicles by the transmitter circuits. For this purpose, recorder 150 is then interconnected with timer 148, as indicated at 149, for causing the recorder to periodically repeat its message in proper sequence following the actuation by timer 148 of switch sections *22a,22b* and selector switch 42, in predetermined fashion. For this purpose, recorder 150 is shown to be interconnected with switch section *22a* by a connection 151. In this way, transmitting system 11 is configured for providing transmission, on a repeated basis, of a recorded voice message which may be received by vehicles such as that indicated at 143, indicating, for example, "Construction Ahead—Reduce Speed to 10 M.P.H. Be Prepared to Stop." Or, "Caution, Dangerous Intersection Ahead, Heavy Cross Traffic." Or, "Danger Ahead—Narrow Bridge, One Lane Closed." A further advantage in such system is that, because transmission of such warning messages occurs in a police band, police vehicles such as that indicated at 146 may have their conventional police receiving equipment of their vehicles tuned to a frequency at which emergency warnings of the type just described are to be transmitted. In this way, a police officer may tune in and verify the proper operation of a fixed unit containing transmitting system 11 as configured with a timer 148 and recorded message means 150.

Consistent with the foregoing, transmission from a fixed location through the use of a transmitting system 11 of the invention, as configured in accordance with this example, may be utilized in other situations which are enumerated, merely as exemplary of the manner of usage of the invention but without intending to limit its many uses, as follows:

(a) Civil Defense warnings in extreme weather conditions are transmitted from a mobile unit at a location central to all receiving vehicles within a given area exposed to such conditions. Similar Civil Defense transmissions are to be made in the event of war; to provide notice of damage to highways, bridges, or other vehicular trafficways in the event of earthquake, flash flood, or in the event of other disruptive conditions. Such transmissions may include also the exact location of the hazard or condition of danger and state the degree of difficulty which is expected to be encountered by a vehicle operator at such location.

(b) Assuming that a transmitting system 11 of the invention is provided with an extrinsic switch for turning on the system, i.e., some means for actuating pushbutton switch sections *22a,22b* and preselecting the appropriate position of selector switch 42, systems of the invention are utilized to cause transmission of a pulse coded signal from a transmitting site to a police headquarters station or other site containing a receiving system 51 of the invention. For example, a signal may be transmitted in response to a vehicle entering wrong traffic lanes of a highway, thus placing a vehicle in the dangerous situation of opposing on coming traffic. The transmitted signal is then received by a police headquarters station or by a police vehicle having receiving system 51. Accordingly, such usage of the invention makes possible not only the prompt alerting of police when a vehicle is in such a life-threatening situation, but also provides means available to the police for immediately communicating with the vehicle operator of his mistake and what action should be taken by such operator.

EXAMPLE IV

Figure 5:
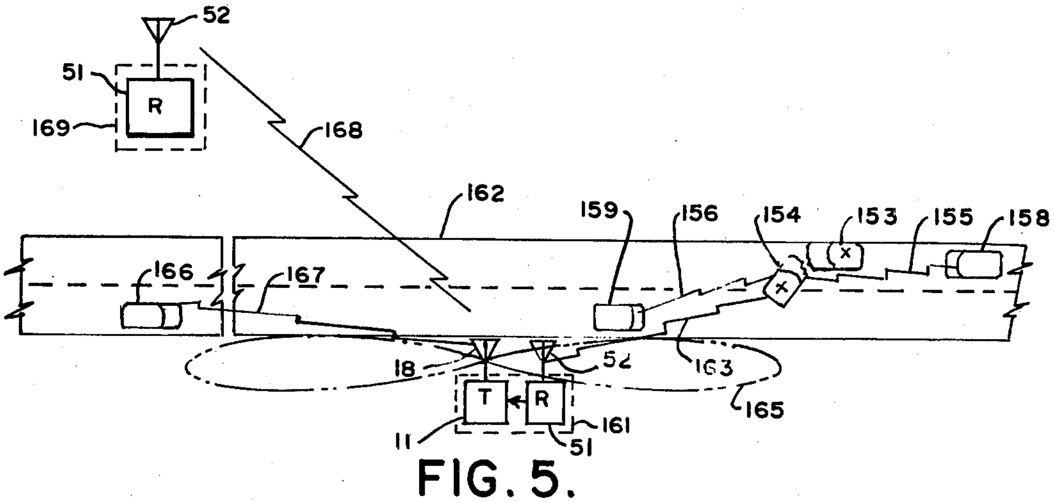
FIG. 5 is a pictorial illustration of encoded radio frequency transmissions from a police vehicle to a civilian vehicle over terrain obscuring the driver's view of the police vehicle.

A vehicle 153 is shown in FIG. 5 to have been involved in an accident with another vehicle 154. Either or both of said vehicles may be provided with a transmitting system 11 with which is interconnected the collision-responsive apparatus and circuitry of FIG. 6 for causing transmission of encoded radio frequency signals from the transmitting system of the vehicle. Such signals are provided as indicated at 155 and 156 by radio transmission to other vehicles, such as those indicated at 158,159, which are equipped with a receiving system 51, which approach the scene of the accident whereby the operators of such vehicles are alerted by flashing lights and/or audio signalling of the occurrence of an accident and may take appropriate action, such as carefully bringing their vehicles to a halt before reaching the accident.

As is apparent from examination of FIG. 6, latch 120 continues to provide conduction, periodically interrupted, across terminals 124,124' (i.e., until reset) whereby signals are repetitively provided by pulse generator circuit 26 of the transmitting system for transmission via an antenna 18. Accordingly, at least one of vehicles 153,154 involved in the collision (even if the transmitting circuitry of one should be inoperative) continues to transmit pulse coded signals which provide to the drivers of other vehicles not involved in the accident with warning in time to take appropriate action to avoid becoming involved. Because of the nature of receiving system 51, the continued transmission of the pulse modulated signal from one of the vehicles 154 involved in the accident is continually monitored by the receiving system of vehicles 158,159 which approach the vicinity of the accident.

Pulse-modulated transmission of a signal within a police band from such vehicle 154 may also be received by a receiving system 51 of the invention which is located within a temporarily or semipermanently fixed mobile unit 161 located adjacent the highway 162 upon which the vehicles must pass, such location possibly being hundreds of meters or even several kilometers remote from the scene of the accident but nevertheless within receiving range of the transmitting vehicle 154. Such vehicle then transmits, as indicated at 163, to the antenna 52 of receiving system 51 within fixed unit 161. Such unit also contains a transmitting system 11 of the invention interconnected with receiving system 51, and particularly responsive to an appropriate warning/indicator circuit 74 of such receiving system 51, to be caused to provide pulse-modulated transmission by means of antenna 18 on the same or different frequency as that received by receiving system 51. Transmitting system 11 is adapted to provide much greater transmitting power than the transmitting system contained within vehicle 154, whereby the signal transmitted by antenna 18 will cover a much greater range than would be provided by an individual vehicle.

Antenna 18 is specially configured, or may be constituted by an antenna array, adapted to provide a radiation pattern 165 which is highly directional, being such as to provide the greatest signal strength along an axis substantially in alignment with highway 162, as evidenced by the propeller-shaped lobe having its major axis parallel to highway 162. If so, the signal provided by transmitting system 11 at unit 161 is expected to be received a great distance, possibly several kilometers from the unit 161, as by a vehicle such as that indicated at 166. Vehicle 166 receives such radiated signal 167 even though the vehicle is located quite remote from unit 161.

Alternatively, the radiation pattern of antenna 18 is unidirectional. In such event, same may be expected to provide radio transmission as indicated at 168 to locations removed from highway 162 as, for example, to a central police headquarters location 169 having a receiving system 51 of the invention, whereby such headquarters is provided with a signal from unit 161 upon occurrence of the accident depicted. Thus, a police vehicle is immediately dispatched in the direction of the signal being received from unit 161 and, therefore, reaches the general vicinity of the accident most expeditiously, obviating the need for one of the motorists or witnesses to the accident to reach a telephone for the purpose of calling the police to the scene of the accident, a process which often loses valuable time during which occupants of the vehicles involved in the accident who may be injured are denied treatment of the same, with consequent suffering and threat to life.

EXAMPLE V

Vehicles are equipped with a receiving system 51 of the invention which includes warning/indicator circuitry 74 as described. Such circuitry includes yellow, red, and blue lamps placed where they may be immediately noticed, upon illumination, of the driver. Operation of the lamps in response to receiving of a pulse-modulated signal by such system is as follows:

1. A flashing illumination of the yellow lamp signifies caution to the driver. The source of the pulse-modulated transmission producing such signal is from (a) mobile unit containing a transmitting system 11 which unit is set by the roadside; or (b) a police mobile unit (i.e., police vehicle) or base station.

2. An alternating yellow-red flashing of the lamps signifies to the operator of the vehicles that a collision has occurred ahead. The source of the pulse-modulated radio frequency transmission providing such signal is from: (a) one or more vehicles involved in the collision which vehicles are equipped with collision-responsive circuitry 110 in conjunction with a transmitting system 11 of the invention; or (b) a police mobile unit (i.e., police vehicle) which is at the site of the collision which vehicle has arrived at the site.

3. A flashing red lamp together with an interrupted tone signifies a condition of the road being obstructed, a bridge out, a single lane being available; or dangerous intersection, etc. The source of the pulse modulated radio frequency signal causing such signalling is from (a) a police mobile unit within a police vehicle at the site; or (b) a temporary unit containing a transmitting system of the invention placed near the site.

4. Flashing illumination of a blue lamp signals warning of severe weather and indicates to the recipient the need to tune to a local radio station. An uninterrupted blue lamp with an interrupted tone signifies to the recipient to stand by for a civil defense message. The source of such radio transmission providing this signalling may be from one of the following equipped with a transmitting system 11 of the invention: (a) civil defense headquarters; (b) police headquarters; or (c) police mobile unit.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

Having described my invention, what I claim and desire to obtain by Letters Patent is:

1. An electronic system for traffic control and warning purposes comprising transmitting means within an authorized mobile unit including a frequency modulation transmitter for transmitting a frequency modulation carrier signal at a preselected frequency within a preselected police communications frequency band, said carrier signal being adapted to be selectively either voice or pulse modulated, a transmitting antenna for radiating said modulated carrier signal, voice modulation means for modulating said carrier signal with a voice message, pulse modulation means for selectively modulating said transmitted carrier signal with preselected pulse messages of preselected pulse patterns and receiving means within each of a plurality of civilian vehicles separate from said mobile unit, including a receiving antenna for picking up the modulated carrier signal when the respective civilian vehicle is within at least the general vicinity of said mobile unit, radio frequency scanning means for automatic scanning of said police communications band for providing selective response to said modulated carrier signal regardless of the frequency thereof within said police frequency band, demodulator means for providing a demodulated message signal, means for deriving a pulse message from the demodulated message signal including means for separating pulse information from non-pulse audio signals, signal detection means for causing said scanning to terminate in response to a preselected pulse message being derived from the demodulated message signal, signalling means responsive to a pulse message of a predetermined first type for providing at least a first form of signal to an operator of such civilian vehicle receiving said modulated carrier signal, transducer means within such receiving vehicle for reproducing voice messages, and first switching means responsive to a pulse message of a predetermined second type for causing a voice message of the demodulated message signals to be supplied to said transducer means.

2. An electronic system for traffic control and warning purposes as defined in claim 1 and further characterized by said receiving means including radio frequency amplifier means interconnected with said receiving antenna, oscillator means interconnected with said amplifier means and selectively controllable for providing tuning of said receiving means, said radio frequency scanning means being interconnected with said oscillator means for varying the frequency to provide repetitive scan tuning of said police communications band.

3. An electronic system for traffic control and warning purposes as defined in claim 2 and further characterized by said receiving means comprising scan control means including a first timer means for determining an interval of time for repeatedly scanning of said band.

4. An electronic system for traffic control and warning purposes as defined in claim 3 and further characterized by said scan control means comprising signal level detection means for causing scanning to terminate upon the receiving of a modulated carrier signal from said mobile unit of predetermined signal strength.

5. An electronic system for traffic control and warning purposes as defined in claim 4 and further characterized by said scan control means including a second timer means for determining a preselected interval of time during which such scanning remains stopped upon said detection of a signal of predetermined signal strength.

6. An electronic system for traffic control and warning purposes as defined in claim 4 and further characterized by said receiving means comprising an intermediate frequency amplifier for receiving signals provided by said radio frequency means, said signal level detection means comprising a squelch circuit interconnected with said intermediate frequency detection means, and means for setting a squelch level for response by said squelch control means to cause said scanning to terminate upon receiving a radio frequency signal above a predetermined rejection level of signal strength.

7. An electronic system for traffic control and warning purposes as defined in claim 1 and further characterized by said receiving means comprising sequential switching means responsive to said separated pulses, said signalling means being operative in response to said sequential switching means, said first switching means being also operative in response to said sequential switching means.

8. An electronic system for traffic control and warning purposes as defined in claim 1 and further characterized by said signalling means comprising a plurality of signalling circuits for providing a plurality of forms of signals in response to corresponding pulse patterns of the pulses of said pulse message.

9. An electronic system for traffic control and warning purposes as defined in claim 1 and further comprising abnormal acceleration responsive means carried by said mobile unit including an acceleration sensor having an element for changing an electrical circuit relationship in response to such vehicle encountering abnormal acceleration, circuit means responsive to said change in electrical circuit relationship for providing a switching function, means for causing said switching function to initiate transmission by said transmitting means of a carrier signal with a preselected pulse message, said mobile unit comprising a vehicle.

10. An electronic system for traffic control and warning purposes as defined in claim 1 and further comprising recorder means within said mobile unit containing a recorded voice message, recycling timer means for controlling said recorder means, said recycling timer being functionally interconnected with said transmitting means to cause the same to automatically provide continuous repeated transmission of said carrier signal modulated with the voice message contained by said recorder means.

11. An electronic system for traffic control and warning purposes as defined in claim 1 and further characterized by said pulse modulation means comprising a pulse generator and circuit means for preselecting a predetermined number of pulses in a pulse pattern to be provided by such pulse generator for pulse modulation of said carrier signal.

12. An electronic system for traffic control and warning purposes as defined in claim 1 and further characterized by said mobile unit comprising a police vehicle, said voice modulation means comprising a microphone for permitting the operator of said police vehicle to provide a voice message to operators of said civilian vehicles receiving said modulated carrier signal.

13. An electronic system for traffic control and warning purposes as defined in claim 12 and further comprising switching means responsive to operation of said pulse modulation means to prevent voice modulation by use of said microphone from occurring during transmission of a pulse modulated carrier.

14. An electronic system for traffic control and warning purposes, said system comprising transmitting means within an authorized mobile unit, including a frequency modulation transmitter for transmitting a frequency modulation carrier signal at a preselected frequency within a preselected frequency band utilized for routine police communications, said carrier signal adapted selectively to be either voice or pulse modulated, a transmitting antenna for radiating said modulated carrier signal, voice modulation means including a microphone for modulating said carrier signal with a voice message, pulse modulation means selectively operable for selectively modulating said transmitted carrier signals with pulse messages of preselected pulse patterns, means for preventing modulation of said carrier signal with a voice message when said pulse modulation is provided, and receiving means within each of a plurality of civilian vehicles separate from said mobile unit including a receiving antenna for picking up the modulated carrier signal when the respective civilian vehicle is within at least the general vicinity of said mobile unit, radio frequency amplifier means interconnected with said receiving antenna, converter means, frequency variable oscillator means interconnected with said converter means and selectively controllable as to frequency for providing tuning of said preselected frequency band by scanning, scanner control means interconnected with said oscillator means to provide said scanning repetitively of said band by controlling the frequency of said oscillator means, intermediate frequency amplifier means interconnected with said converter means for providing an intermediate frequency modulated signal to a demodulator, a squelch circuit interconnected with said intermediate frequency amplifier means and with said scanning control means for causing scanning to terminate upon the receiving of a signal of signal strength greater than a preselected rejection level, audio frequency amplifier means interconnected with said demodulator for amplifying message signals demodulated by said demodulator, pulse separator means for separating the pulse message from the demodulated message signals to distinguish between said pulses and non-pulse audio signals, said pulse message being constituted by at least one of a plurality of possible pulses in a pulse pattern, sequential switching means responsive to said separated pulses, a plurality of signal means including visual signal devices, each of said signal means being operative in response to sequential switching by said sequential switching means for providing visual signalling to an operator of such civilian vehicle receiving said modulated carrier signals, transducer means within such receiving vehicle for reproducing voice messages, and further switching means, responsive to further sequential switching by said sequential switching means, for interconnecting said transducer with said audio frequency amplifier means for causing a demodulated voice message to be supplied to said transducer means, whereby the driver of such receiving vehicle is selectively provided with either a visual signal or a voice signal, or both, from said mobile unit upon authorized transmission therefrom.

15. An electronic system for traffic control and warning purposes as defined in claim 14 and further characterized by said receiving means comprising scan control means including a first timer means for determining an interval of time for repeated scanning of said band, said scanning being repetitive.

16. An electronic system for traffic control and warning purposes as defined in claim 15 and further characterized by said scan control means including second timer means for determining a preselected interval of time during which scanning remains terminated upon detection of a signal of predetermined signal strength.

17. An electronic system for traffic control and warning purposes as defined in claim 16 and further characterized by said receiving means comprising means for preventing scanning upon said driver being provided with either a visual or voice signal, or both.

18. An electronic system for traffic control and warning purposes as defined in claim 17 and further characterized by said means for preventing scanning interconnecting said sequential switching means with said scanner control means for causing scanning to terminate upon operation of said sequential switching means.

19. An electronic system for traffic control and warning purposes as defined in claim 18 and further characterized by said receiving means also comprising a third timer means interconnected with said sequential switching means for causing automatic resetting thereof after a predetermined period following operation of said sequential switching means.

20. An electronic system for traffic control and warning purposes as defined in claim 14 and further characterized by said receiving means comprising tone code discriminator means for responding only to demodulated message pulses of preselected tone frequencies.

21. An electronic system for traffic control and warning purposes as defined in claim 14 and further characterized by said pulse separator means being adapted to receive signals having a waveform which is a composite of pulse and audio frequency components, said pulses having an amplitude greater than the audio frequency components, said pulse separator means discriminating between such amplitudes for passing only pulse components.

22. An electronic system for traffic control and warning purposes as defined in claim 21 and further characterized by said pulse separator means comprising amplifier means biased for being cut off to reject audio frequency components but conductively operative for passing and amplifying tops of said pulses.

23. An electronic system for traffic control and warning purposes as defined in claim 14 and further characterized by said signal means comprising a plurality of warning indicator circuits each including at least a visual signal device, each of said warning indicator circuits including circuit means for energizing the respective visual signal device in response to a predetermined sequence of operation of said sequential switching means.

24. An electronic system for traffic control and warning purposes as defined in claim 23 and further characterized by each said warning indicator circuit comprising a latching circuit for maintaining operation of the respective signal device when energized, and means for manually resetting said latching circuit.

25. An electronic system for traffic control and warning purposes as defined in claim 23 and further characterized by said sequential switching means comprising a stepping switch and at least one winding for causing sequential switching by said stepping switch in response to pulses separated by said pulse separator means, said stepping switch including a plurality of sequentially operative contacts interconnected with respective warning indicator circuits for operation thereof to energize the respective signal device upon respective individual ones of said contacts being operative.

26. An electronic system for traffic control and warning purposes as defined in claim 25 and further characterized by said stepping switch including a second winding for resetting of said stepping switch, and timer means interconnected with said second winding and responsive to initial operation of said stepping switch for causing automatic resetting of said stepping switch after a predetermined period following said initial operation.

27. An electronic system for traffic control and warning purposes as defined in claim 25 and further characterized by said warning indicator circuits each including time delay means for time delayed operation of the respective circuit in response to sequential operativity of contacts of said stepping switch.

28. An electronic system for traffic control and warning purposes as defined in claim 14 and further characterized by said transmitting means comprising first switching means manually operable for causing transmission of a modulated carrier signal, said means for preventing modulation of said carrier signal with a voice message when said pulse modulation is provided comprising a second switching means connected for preventing a voice modulation signal from being caused by output of said microphone, said second switching means being operative concomittantly with said first switching means.

29. An electronic system for traffic control and warning purposes as defined in claim 14 and further characterized by said transmitting means comprising a timing circuit adapted for causing pulses to be supplied in a pattern, and selector switch means manually operable for selecting a discrete number of pulses to be supplied in a pattern by said timing circuit in accordance with desired signalling modes represented by different discrete numbers of pulses in a pattern.

30. An electronic system for traffic control and warning purposes as defined in claim 29 and further characterized by said transmitting means comprising a pulse generator supplying pulse signals at a preselected pulse repetition rate, said timing circuit controlling the switching of pulse signals from said pulse generator for pulse modulation of said carrier signal.

31. An electronic system for traffic control and warning purposes as defined in claim 30 and further characterized by said transmitting means comprising a further timing circuit for controlling a time interval during which a pulse pattern is permitted to be provided for pulse modulation of said carrier signal.

32. An electronic system for traffic control and warning purposes as defined in claim 30 and further characterized by said transmitting system comprising a switching circuit interconnecting said pulse generator and said transmitter, said timing circuit controlling the operation of said switching circuit.

33. An electronic system for traffic control and warning purposes as defined in claim 32 and further characterized by said pulse generator providing pulses at a predetermined tone frequency, said switching circuit being controlled by said further timing circuit to cause groups of said pulses to be provided for modulation of said carrier signal.

* * * * *